US012764809B2

(12) United States Patent
Ahmad et al.

(10) Patent No.: US 12,764,809 B2
(45) Date of Patent: Oct. 13, 2026

(54) METHODS, APPARATUS, AND SYSTEMS FOR POWER EFFICIENT D2D COMMUNICATIONS FOR WEARABLE AND IOT DEVICES

(71) Applicant: InterDigital Patent Holdings, Inc., Wilmington, DE (US)

(72) Inventors: Saad Ahmad, Montreal (CA); Martino M. Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 851 days.

(21) Appl. No.: 18/074,805

(22) Filed: Dec. 5, 2022

(65) Prior Publication Data

US 2023/0099812 A1 Mar. 30, 2023

Related U.S. Application Data

(63) Continuation of application No. 16/322,866, filed as application No. PCT/US2017/045164 on Aug. 2, 2017, now abandoned.

(Continued)

(51) Int. Cl.

| | |
|---|---|
| ***H04W 76/14*** | (2018.01) |
| ***H04W 8/00*** | (2009.01) |
| ***H04W 12/037*** | (2021.01) |
| ***H04W 12/06*** | (2021.01) |
| ***H04W 12/08*** | (2021.01) |

(Continued)

(52) U.S. Cl.

CPC ........... *H04W 76/14* (2018.02); *H04W 8/005* (2013.01); *H04W 12/037* (2021.01); *H04W 12/06* (2013.01); *H04W 12/08* (2013.01); *H04W 48/08* (2013.01); *H04W 52/0212* (2013.01); *H04W 88/04* (2013.01)

(58) Field of Classification Search

CPC ... H04W 76/14; H04W 8/005; H04W 12/037; H04W 12/06; H04W 12/08; H04W 48/08; H04W 52/0212; H04W 88/04; H04W 12/33; H04W 4/12; H04W 4/70; H04W 76/11; Y02D 30/70

See application file for complete search history.

(56) References Cited

U.S. PATENT DOCUMENTS

| | | | |
|---|---|---|---|
| 7,813,695 | B2 | 10/2010 | Haartsen |
| 8,270,374 | B2 | 9/2012 | Cai et al. |

(Continued)

FOREIGN PATENT DOCUMENTS

| | | | |
|---|---|---|---|
| CN | 101208980 | A | 6/2008 |
| CN | 101506782 | A | 8/2009 |

(Continued)

OTHER PUBLICATIONS

"3rd Generation Partnership Project; Technical Specification Group Services and System Aspects; Study on LTE support for V2X services (Release 14)", 3GPP TR 22.885 V0.2.0, Apr. 2015, 33 pages.

(Continued)

*Primary Examiner* — Jinsong Hu
*Assistant Examiner* — Rui M Hu
(74) *Attorney, Agent, or Firm* — Flaster Greenberg P.C.

(57) ABSTRACT

Method, apparatus, and system for establishing and conducting device to device communications in a radio network.

12 Claims, 8 Drawing Sheets

Related U.S. Application Data

(60) Provisional application No. 62/373,111, filed on Aug. 10, 2016.

(51) Int. Cl.
*H04W 48/08* (2009.01)
*H04W 52/02* (2009.01)
*H04W 88/04* (2009.01)

(56) References Cited

U.S. PATENT DOCUMENTS

| | | | | |
|---|---|---|---|---|
| 8,532,014 | B2 | 9/2013 | Xu et al. | |
| 9,591,679 | B2* | 3/2017 | Bontu | H04W 76/14 |
| 9,942,914 | B2 | 4/2018 | Heo et al. | |
| 9,999,063 | B2 | 6/2018 | Chatterjee et al. | |
| 10,028,257 | B2 | 7/2018 | Jung et al. | |
| 10,524,199 | B2 | 12/2019 | Pragada et al. | |
| 10,631,224 | B2 | 4/2020 | Buckley | |
| 11,617,218 | B2* | 3/2023 | Thommana | H04B 7/15507 370/329 |
| 2012/0294236 | A1* | 11/2012 | Watfa | H04W 72/04 370/328 |
| 2013/0100929 | A1* | 4/2013 | Liu | H04W 36/0005 370/331 |
| 2013/0125226 | A1 | 5/2013 | Shah et al. | |
| 2013/0183971 | A1* | 7/2013 | Tamaki | H04W 36/08 455/436 |
| 2013/0258967 | A1* | 10/2013 | Watfa | H04W 76/10 370/329 |
| 2013/0287012 | A1* | 10/2013 | Pragada | H04W 76/14 370/338 |
| 2013/0288668 | A1* | 10/2013 | Pragada | H04L 67/51 455/426.1 |
| 2014/0226559 | A1* | 8/2014 | Jactat | H04W 84/047 370/315 |
| 2014/0349570 | A1* | 11/2014 | Pan | H04W 60/00 455/11.1 |
| 2015/0029866 | A1* | 1/2015 | Liao | H04W 48/14 370/254 |
| 2015/0319695 | A1 | 11/2015 | Huang et al. | |
| 2015/0382142 | A1 | 12/2015 | Kim et al. | |
| 2016/0029423 | A1* | 1/2016 | Ke | H04W 72/51 370/329 |
| 2016/0198329 | A1 | 7/2016 | Lee et al. | |
| 2016/0255554 | A1* | 9/2016 | Ke | H04W 48/02 455/436 |
| 2016/0262068 | A1* | 9/2016 | Won | H04W 48/06 |
| 2016/0338094 | A1 | 11/2016 | Faurie et al. | |
| 2016/0381543 | A1* | 12/2016 | Zhang | H04W 4/80 455/411 |
| 2016/0381720 | A1 | 12/2016 | Baek et al. | |
| 2017/0055282 | A1 | 2/2017 | Sadiq et al. | |
| 2017/0111754 | A1* | 4/2017 | Baghel | H04W 76/27 |
| 2017/0290072 | A1* | 10/2017 | Chen | H04W 72/04 |
| 2017/0325270 | A1* | 11/2017 | Tenny | H04W 76/14 |
| 2017/0332425 | A1 | 11/2017 | Tenny et al. | |
| 2017/0366958 | A1 | 12/2017 | Ryu et al. | |
| 2018/0020442 | A1 | 1/2018 | Nair | |
| 2018/0054237 | A1 | 2/2018 | Tseng et al. | |
| 2018/0098370 | A1 | 4/2018 | Bangolae et al. | |
| 2018/0115362 | A1 | 4/2018 | Yasukawa et al. | |
| 2018/0124674 | A1 | 5/2018 | Vutukuri et al. | |
| 2018/0152986 | A1 | 5/2018 | Jung et al. | |
| 2018/0213577 | A1 | 7/2018 | Burbidge et al. | |
| 2018/0234808 | A1* | 8/2018 | Adachi | H04W 72/0453 |
| 2018/0263012 | A1* | 9/2018 | Ryu | H04W 68/02 |
| 2018/0295497 | A1* | 10/2018 | Kim | H04W 8/08 |
| 2019/0028177 | A1 | 1/2019 | Feng | |
| 2019/0036595 | A1 | 1/2019 | Ohtsuji et al. | |
| 2019/0069247 | A1 | 2/2019 | Wu et al. | |
| 2019/0082495 | A1* | 3/2019 | Kim | H04W 76/38 |
| 2019/0124651 | A1* | 4/2019 | Xu | H04W 76/20 |
| 2019/0141566 | A1* | 5/2019 | Hong | H04W 28/04 |
| 2019/0141764 | A1* | 5/2019 | Fu | H04W 28/0268 |
| 2019/0159018 | A1 | 5/2019 | Basu Mallick et al. | |
| 2019/0215762 | A1* | 7/2019 | Kim | H04W 8/005 |
| 2019/0239284 | A1 | 8/2019 | Ku et al. | |
| 2019/0320361 | A1 | 10/2019 | Uchiyama et al. | |
| 2020/0077356 | A1* | 3/2020 | Youn | H04W 68/02 |
| 2020/0100088 | A1* | 3/2020 | Kim | H04W 48/16 |
| 2020/0120728 | A1 | 4/2020 | Wallentin et al. | |
| 2020/0120745 | A1 | 4/2020 | Yang | |
| 2020/0170075 | A1* | 5/2020 | Xu | H04B 7/2606 |
| 2020/0187152 | A1 | 6/2020 | Karampatsis | |
| 2020/0221532 | A1 | 7/2020 | Jung et al. | |
| 2020/0288535 | A1 | 9/2020 | Sharma et al. | |
| 2020/0296738 | A1 | 9/2020 | Inokuchi et al. | |

FOREIGN PATENT DOCUMENTS

| | | | |
|---|---|---|---|
| CN | 102036285 | A | 4/2011 |
| CN | 102257863 | A | 11/2011 |
| CN | 102333330 | A | 1/2012 |
| CN | 102362539 | A | 2/2012 |
| CN | 103503407 | A | 1/2014 |
| CN | 104066200 | A | 9/2014 |
| CN | 104272707 | A | 1/2015 |
| CN | 104519564 | A | 4/2015 |
| CN | 104823511 | A | 8/2015 |
| CN | 104854916 | A | 8/2015 |
| CN | 104918299 | A | 9/2015 |
| CN | 105359554 | A | 2/2016 |
| CN | 105392174 | A | 3/2016 |
| CN | 105432137 | A | 3/2016 |
| CN | 105594140 | A | 5/2016 |
| CN | 105594294 | A | 5/2016 |
| CN | 106470382 | A | 3/2017 |
| WO | 2010088295 | A1 | 8/2010 |
| WO | 2010105432 | A1 | 9/2010 |
| WO | 2013060164 | A1 | 5/2013 |
| WO | 2013163599 | A2 | 10/2013 |
| WO | 2015043289 | A1 | 4/2015 |
| WO | 2015125479 | A1 | 8/2015 |
| WO | 2016069146 | A1 | 5/2016 |
| WO | 2017099833 | A1 | 6/2017 |

OTHER PUBLICATIONS

Ericsson, "ProSe UE to network Relay & Service continuity solution", 3GPP Tdoc S2-150787; SA WG2 Meeting #108, San Jose Del Cabo, Mexico, Apr. 13-17, 2015, 10 pages.

Interdigital, et al., "Solution to Key Issue #3", 3GPP Tdoc S2-171192; 3GPP SA WG2 Meeting #119, Dubrovnik, HR, Feb. 13-17, 2017, 3 pages.

LG Electronics, et al., "New SI proposal: Feasibility Study on LTE-based V2X Services", 3GPP Tdoc RP-151109; 3GPP TSG RAN Meeting #68; Malmo, Sweden, Jun. 15-18, 2015, 7 pages.

Qualcomm Incorporated, "New SI: Further Enhancements LTE Device to Device, UE to Network Relays for Wearables", 3GPP Tdoc RP-160677; 3GPP TSG RAN Meeting #71, Gothenburg, Sweden, Mar. 7-10, 2016, 7 pages.

"English Language Abstract", Chinese Patent Publication No. 106470382, Mar. 1, 2017, 1 page.

3rd Generation Partnership Project, Technical Specification Group Core Network and Terminals, Non-Access-Stratum (NAS) protocol for Evolved Packet System (EPS); Stage 3 (Release 13), 3GPP TS 24.301 V13.6.0, Jun. 2016, 451 pages.

3rd Generation Partnership Project, Technical Specification Group Core Network and Terminals, 3rd Generation Partnership Project; Non-Access-Stratum (NAS) protocol for Evolved Packet System (EPS); Stage 3 (Release 13), 3GPP TS 24.301 V13.6.1, Jun. 2016, 452 pages.

3rd Generation Partnership Project, ProSe direct discovery in limited service state, Qualcomm Incorporated, Samsung, C1-162107, 3GPP TSG-CT WG1 Meeting #97 Ljubljana, Slovenia, Apr. 11-15, 2016, 16 pages.

(56) References Cited

OTHER PUBLICATIONS

"Resolution of TR 23.713 section 7.2 FFS topics", S2-150367_7.2 FFS resolution; 3GPPtsg_sa\WG2_Arch, Jan. 26-30, 2015, 8 pages.

* cited by examiner

METHODS, APPARATUS, AND SYSTEMS FOR POWER EFFICIENT D2D COMMUNICATIONS FOR WEARABLE AND IOT DEVICES

CROSS-REFERENCE TO RELATED APPLICATIONS

This application is a continuation of U.S. Non-Provisional application Ser. No. 16/322,866, filed Feb. 1, 2019, which is the U.S. National Stage, under 35 U.S.C. 371, of International Application No. PCT/US2017/045164, filed Aug. 2, 2017, which claims the benefit of U.S. Provisional Application No. 62/373,111, filed Aug. 10, 2016.

FIELD

The present invention relates to the field of wireless communications and, more particularly, to methods, apparatus and systems for effecting device-to-device (D2D) communications in wireless communication networks.

BACKGROUND

Direct device-to-device (D2D) communications has received a lot of interest recently as major standardization bodies such as IEEE and 3GPP have defined, or are in the process of defining, specifications to support D2D communications. In the case of 3GPP and LTE-based radio access, support for D2D communications is being introduced to allow for cost-efficient and high-capability public safety communications using LTE technology. This is primarily motivated by the desire to harmonize the radio access technology across jurisdictions in order to lower the capital expense and operating expense of radio-access technology available for the use of public safety (PS) types of applications. Another significant motivating factor is the fact that LTE is a scalable wideband radio solution that allows for efficient multiplexing of different service types like voice and video.

Since Public Safety (PS) applications often require radio communications in areas that are not under radio coverage of an LTE network, e.g. in tunnels, in deep basements, or following catastrophic system outages, there is a desire to support D2D communications for PS in the absence of any operating network or prior to the arrival of AdHoc deployed radio infrastructure. However, even when operating in the presence of operating network infrastructure, PS communications typically still will require higher reliability than commercial services.

PS type applications, e.g. between first responders, will very likely include direct push-to-talk speech services using multiple talk groups. Additionally, to make efficient use of the capabilities an LTE broadband radio provides, PS type applications may include services such as video push or download.

It is expected that once deployed, D2D communications will be available, not only for PS type applications, but also for commercial uses. One example may be the case of utility companies, which often also require support for 2-way radio communications in areas not covered by network infrastructure. Furthermore, D2D services such as Discovery are suitable signaling mechanisms to allow for proximity-based services and traffic offload using LTE-based radio access in commercial use cases.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely.

Furthermore, like reference numerals in the figures indicate like elements, and wherein.

DETAILED DESCRIPTION

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

I. EXAMPLE NETWORKS FOR IMPLEMENTATION

The present disclosure focuses on improvements for D2D communications in the next generation of 3GPP LTE Radio Access Network (RAN) (commonly referred to as 5G or New Radio (NR)). However, the concepts and inventions disclosed herein have wider applicability. The following is a description of the basic structures of some of the more common RAN technologies and related devices in use today and to which these concepts may be applied, including a description of the current 3GPP LTE architecture.

Figure 1A:
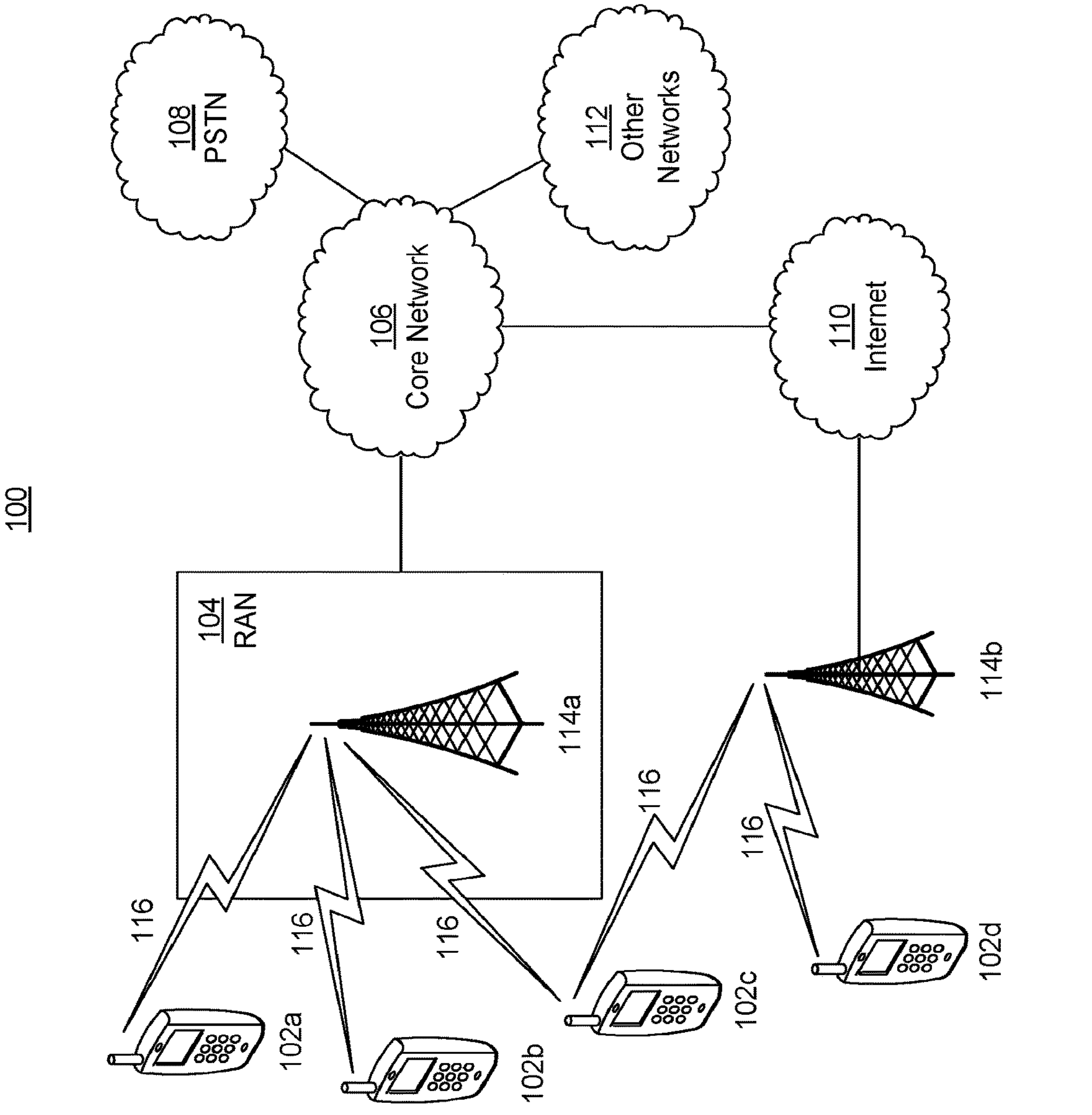
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102*a*, 102*b*, 102*c*, 102*d*, a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106/107/109, the Internet 110, and/or the other networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple output (MIMO) technology and may utilize multiple transceivers for each sector of the cell.

The base stations 114*a*, 114*b* may communicate with one or more of the WTRUs 102*a*, 102*b*, 102*c*, 102*d* over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable Radio Access Technology (RAT) for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network

106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM, UMTS, CDMA 2000, WiMAX, or WiFi radio technology.

The core network 106/107/109 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
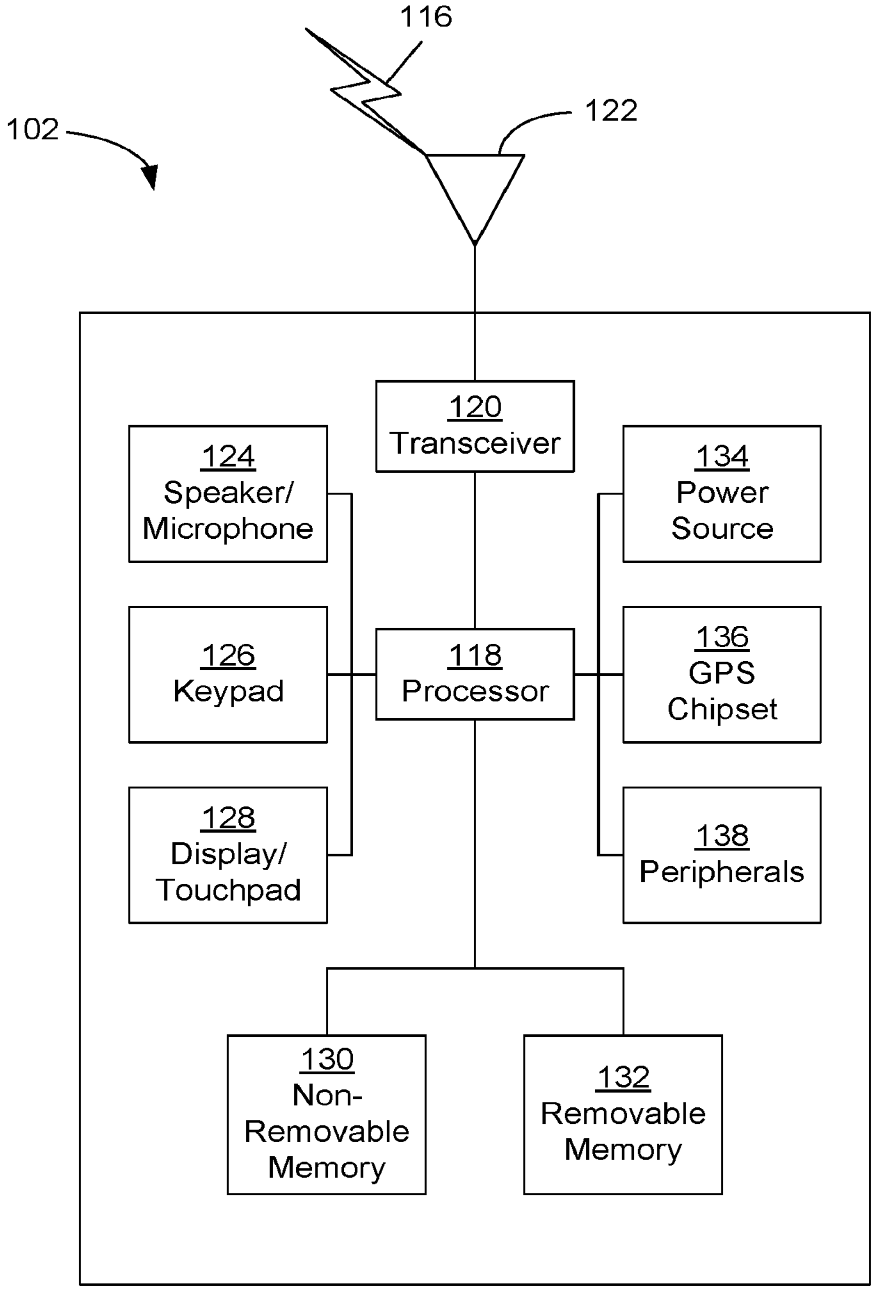
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like. In a case where the peripherals 138 includes one or more sensors, the sensors may be one or more of a gyroscope, an accelerometer; an orientation sensor, a proximity sensor, a temperature sensor, a time sensor; a geolocation sensor; an altimeter, a light sensor, a touch sensor, a magnetometer, a barometer, a gesture sensor, and/or a humidity sensor.

The WTRU 102 may include a full duplex radio for which transmission and reception of some or all of the signals (e.g., associated with particular subframes for both the UL (e.g., for transmission) and downlink (e.g. for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118).

Figure 1C:
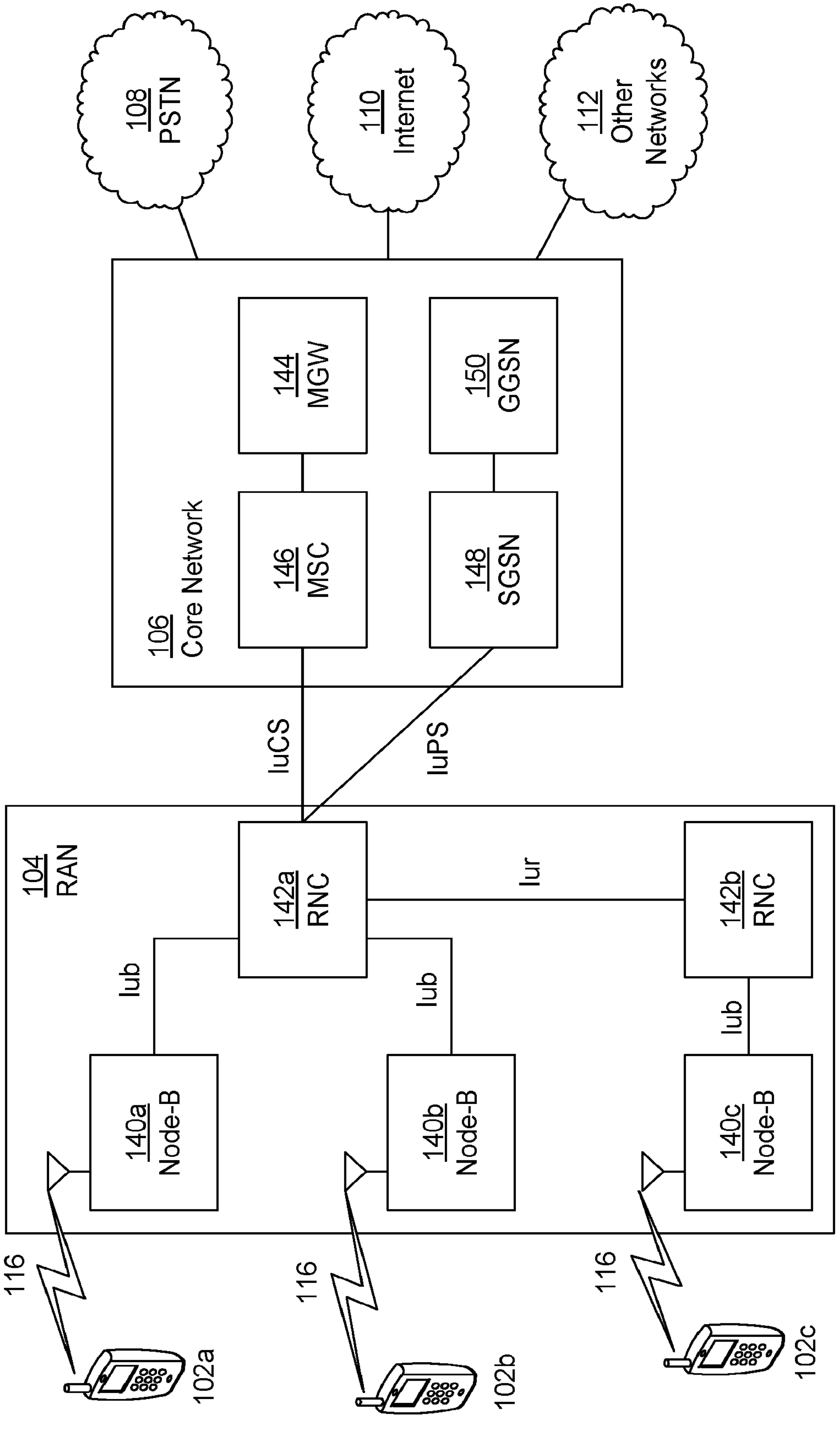
FIG. 1C is a system diagram illustrating an example radio access network and another example core network that may be used within the communications system illustrated in FIG. 1A according to an embodiment.

FIG. 1C is a system diagram illustrating the RAN 103 and the core network 106 according to another embodiment. As noted above, the RAN 103 may employ a UTRA radio technology to communicate with the WTRUs 102*a*, 102*b*, 102*c* over the air interface 115. The RAN 103 may also be in communication with the core network 106. As shown in FIG. 1C, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 1C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the other networks 112, which may include other wired and/or wireless networks that are owned and/or operated by other service providers.

Figure 1D:
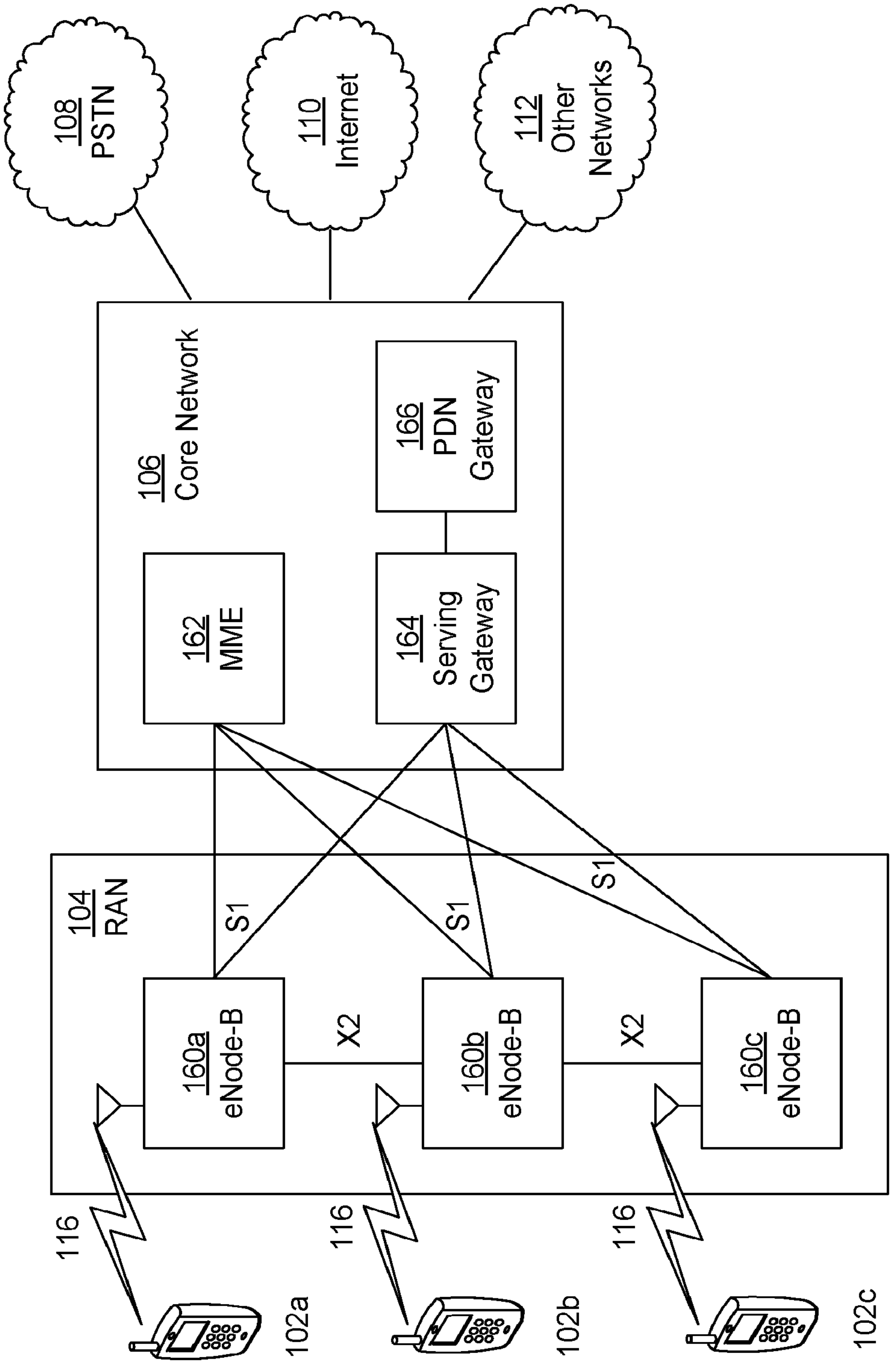
FIG. 1D is a system diagram illustrating another example radio access network and another example core network that may be used within the communications system illustrated in FIG. 1A according to an embodiment.

FIG. 1D is a system diagram illustrating the RAN 104 and the core network 107 according to an embodiment. As noted above, the RAN 104 may employ an E-UTRA radio technology to communicate with the WTRUs 102*a*, 102*b*, 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1D, the eNode-Bs 160*a*, 160*b*, 160*c* may communicate with one another over an X2 interface.

The core network 107 shown in FIG. 1D may include a mobility management entity (MME) 162, a serving gateway (SGW) 164, and a packet data network (PDN) gateway (or PGW) 166. While each of the foregoing elements are depicted as part of the core network 107, it will be appreciated that any of these elements may be owned and/or operated by an entity other than the core network operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The serving gateway 164 may be connected to each of the eNode Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The serving gateway 164 may be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the other networks 112, which may include other wired and/or wireless networks that are owned and/or operated by other service providers.

Figure 1E:
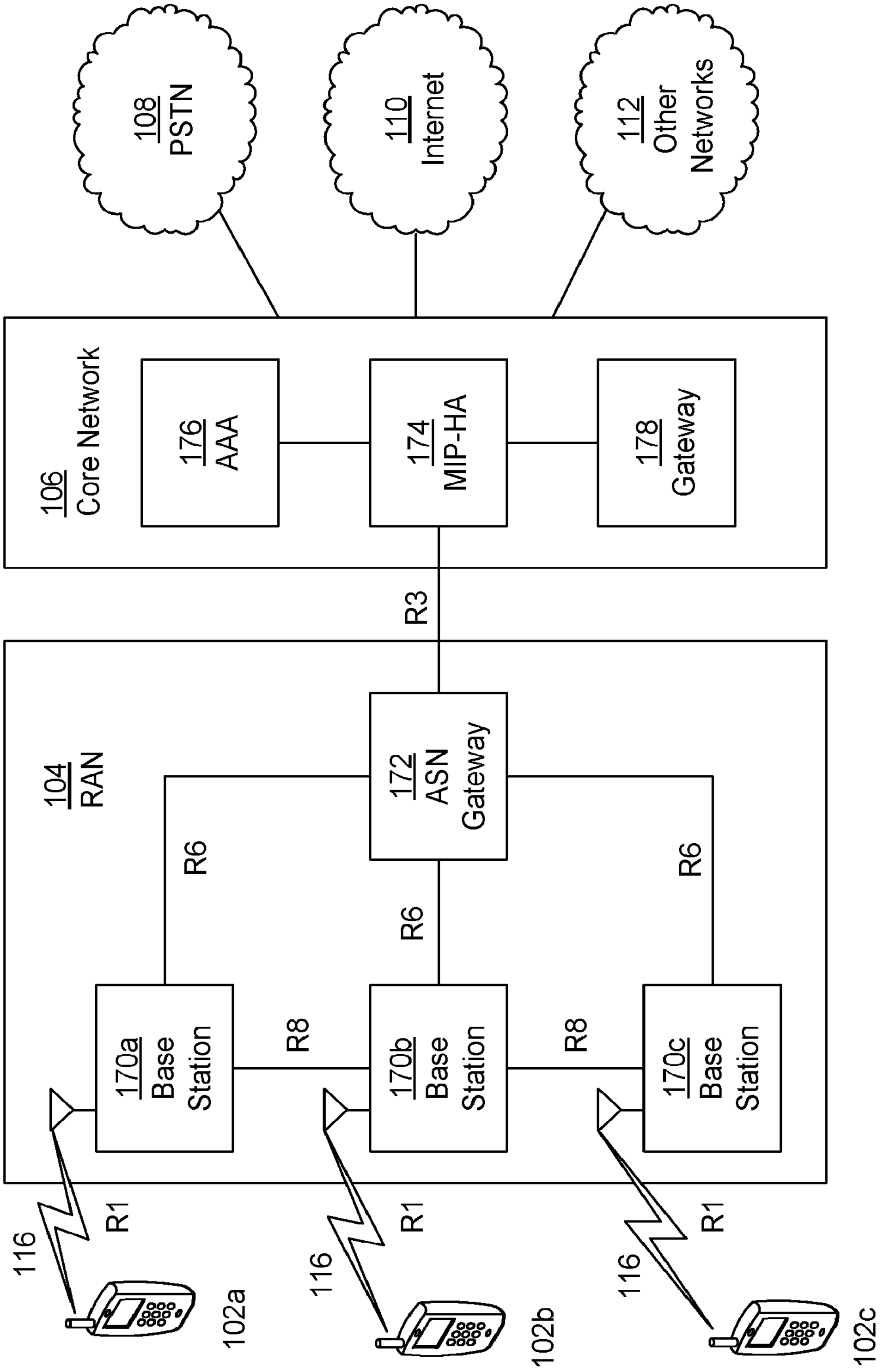
FIG. 1E is a system diagram illustrating a further example radio access network and a further example core network that may be used within the communications system illustrated in FIG. 1A according to an embodiment.

FIG. 1E is a system diagram illustrating the RAN 105 and the core network 109 according to an embodiment. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. The base station 180*a*, for example, may use multiple antennas to transmit wireless signals to, and/or receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 100*c*.

As shown in FIG. 1E, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any of these elements may be owned and/or operated by an entity other than the core network operator.

The MIP-HA 184 may be responsible for IP address management, and may enable the WTRUs 102*a*, 102*b*, 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. The gateway 188 may provide the WTRUs 102*a*, 102*b*, 102*c* with access to the other networks 112, which may include other wired and/or wireless networks that are owned and/or operated by other service providers.

Although not shown in FIG. 1E, it will be appreciated that the RAN 105 may be connected to other ASNs, other RANS (e.g., RANs 103 and/or 104) and/or the core network 109 may be connected to other core networks (e.g., core network 106 and/or 107. The communication link between the RAN 105 and the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

Although the WTRU is described in FIGS. 1A-1E as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP, and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent 20 MHz channel to form a 40 MHz wide contiguous channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as Machine Type Communication (MTC) devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

II. D2D

D2D communications using LTE based radio access are designed to operate in either a network-control mode or a UE autonomous mode, hereafter referred to as Mode 1 and Mode 2, respectively. Mode 1 (network controlled) is only possible if the relay D2D terminal is in radio range of a LTE base station. A D2D terminal will fall back to Mode 2 (UE autonomous) operation if it cannot communicate with an LTE base station. In Mode 2, a UE will mostly use channel access parameters pre-stored in the UE.

For D2D communications in Mode 1, the LTE base station will reserve a selected set of UL subframes for D2D transmissions. The LTE base station also may announce a set of UL subframes, including associated parameters, in which D2D communications for neighbor cells or Mode 2 terminals might be received. Not necessarily all LTE system bandwidth (BW) in a subframe that is reserved for D2D may be available for D2D transmissions. When operating in Mode 1, radio resources for D2D communications are granted to a D2D terminal by the serving cell. The D2D grant from the network is preceded by an UL transmission by the terminal using the normal UL channel(s) of the cell indicating to the base station the amount of D2D data that the terminal wishes to transmit. The D2D grant received by the D2D terminal from the LTE base station on a DL control channel of the cell will allow the D2D terminal to use certain selected radio resources, i.e., certain resource blocks (RBs) in certain subframes over a certain scheduling period.

In Mode 1, the D2D terminal will transmit a Scheduling Assignment (SA) request message in a first set of one or more D2D subframe(s) and then it will transmit the D2D data in a second set of D2D subframes in a scheduling period. Scheduling assignments will contain, among other things, an identifier field, a Modulation and Coding Scheme (MCS) field, and a resource indicator and Tracking Area (TA) field. D2D data packets contain, among other things, a Medium Access Control (MAC) header with source and destination addresses. Multiple logical channels may be multiplexed and sent as part of a single transport block (TB) in a given D2D subframe by a UE.

For D2D communications in Mode 2, the D2D terminal selects time/frequency radio resources autonomously. Channel access parameters, such as the subframes for use with transmissions of SA control messages and corresponding D2D data, scheduling periods or monitoring subframes, are typically pre-configured and stored on the D2D terminal. Except for the UL traffic volume indication and the DL D2D grant phase (both discussed above in connection with Mode 1 operation), Mode 2 terminals follow essentially the same transmission behavior as Mode 1 terminals, i.e. they will also transmit SA request messages followed by D2D data in scheduling periods.

For D2D communications in both Mode 1 and Mode 2, D2D terminals may also transmit auxiliary D2D signals, such as D2D synchronization signals and channel condition messages (e.g., CQI) to aid receivers in demodulating the D2D terminal's transmissions.

D2D communications using LTE based radio access can carry voice channels or data packets. A special case of D2D communications is D2D discovery service. D2D discovery, unlike voice channels, typically requires only small packet transmissions that can often fit in one, two, or a few subframes. For example, these packets may contain application data announcing availability of devices or software applications to participate in D2D data exchanges with terminals in the vicinity.

D2D discovery may or may not use the same channel access protocol as is used for D2D communications for voice or data. For the case of D2D discovery service when in coverage of an LTE base station, D2D discovery resources can be allocated separately from those used for D2D communications with voice or generic D2D data. Radio resources for D2D discovery messages may be selected autonomously by D2D terminals from a set of resources reserved by the eNB and periodically recurring time-frequency radio resources in certain UL subframes (Type 1 discovery) or they may be explicitly allocated by the LTE serving cell to the D2D terminals (Type 2 discovery). The latter case is similar to D2D communication Mode 1 in that the resources are allocated by the network. On the other hand, it is different in that transmissions of scheduling assignments are not necessary when transmitting D2D discovery messages. In some cases, however, even D2D terminals transmitting only D2D discovery messages may still be required to transmit auxiliary D2D synchronization signals to assist D2D receivers.

There is significant interest in using LTE technology to connect and manage low cost MTC devices. One important example of such low cost devices are wearables, which also have the benefit of almost always being in close proximity to a smartphone that can serve as a relay.

A Study Item (SI) on enhancements to D2D for Wearables and Internet of Things (IoT) devices has been discussed in 3GPP RAN (See RP-160677, Further Enhancements to LTE Device to Device, UE to Network Relays for IoT and Wearables). In this SI, the aim is to study the application of D2D, including non-3GPP short-range technologies, to such devices. In particular, there are two main aspects to be further enhanced in LTE technology to enable D2D-aided wearable and MTC applications, namely, enhancements of UE-to-Network relaying functionality and enhancements to enable reliable unicast PC5 link to at least support low power, low rate, and low complexity/cost devices. With regard to enhancement of UE-to-Network relaying functionality, the UE-to-Network relaying architecture in ProSe (Proximity Services) does not differentiate the traffic of the remote UE from that of the relay UE in the access stratum. This model limits the ability of the network and the operator to treat the remote UE as a separate device, e.g., for billing or security. In particular, the 3GPP security associations do not extend end-to-end between the network and the remote UE. Thus, the relay UE may have unfettered access to the remote UE's communications. This could be a security risk for the remote UE in some cases.

UE-to-Network relaying should be enhanced to support (1) end-to-end security through the relay link, (2) service continuity, (3) E2E QoS (End-to End Quality of Service) where possible, (4) efficient operation with multiple remote UEs, and (5) efficient path switching between Uu and D2D air-interfaces. Relaying using D2D can also be based on non-3GPP technologies such as Bluetooth and Wi-Fi. Some enhancements, such as service continuity, can make relaying more attractive for such technologies in commercial use cases. This can be especially useful for wearables due to their usage patterns with proximity to the user's smartphone, as well as form-factor limitations that may make a direct Uu connection less practical (e.g., due to limits on battery size). Relaying can enable significant power savings for remote UEs (that are getting their traffic relayed). This is especially true for deep coverage scenarios. One cost effective way to introduce relaying is to use unidirectional D2D links between remote devices and relay devices. In such cases, the relay UE is utilized to relay only uplink data from the remote UE. The advantage of this approach is that no additional RF capability for D2D reception is added to the remote UE.

With regard to enhancements to enable reliable unicast PC5 link to at least support low power, low rate, and low complexity/cost devices, low cost D2D devices can be enabled by reusing the ideas developed during NB-IoT (Narrow Band-IoT) and eMTC studies, e.g., the NB-IoT/eMTC uplink waveform can be reused for D2D. Such devices will potentially use a single modem for communicating with the Internet/cloud and for communicating with proximal devices. The current PC5 link design inherited from the broadcast-oriented design driven by public safety use cases represents a bottleneck that prevents low power and reliable D2D communication due to lack of any link adaptation and feedback mechanisms. These shortcomings do not allow achieving target performance metrics for wearable and MTC use cases in terms of power consumption, spectrum efficiency, and device complexity. Reduced power consumption and low complexity are the key attributes of wearable and MTC use cases that are typically characterized by small form factors and long battery lifetime.

Figure 2:
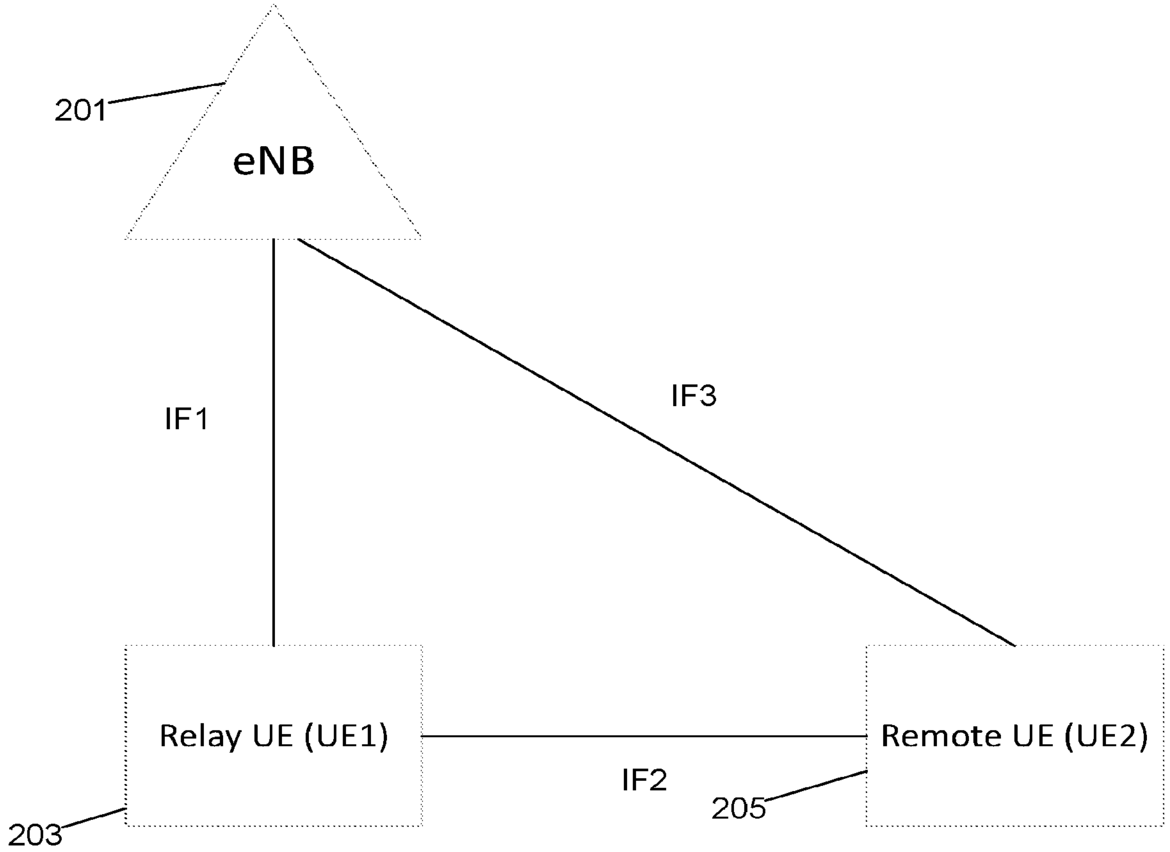
FIG. 2 is a block diagram illustrating the basic communication architecture for D2D communications in a radio access network.

FIG. 2 shows the basic architecture for a remote UE 205 and relay UE 203, including their connections with an eNB 201. The basic assumptions in the context of the current SI in 3GPP (see RP-160677, Further Enhancements to LTE Device to Device, UE to Network Relays for IoT and Wearables) are that: (1) Interface (IF) 1 is a Uu interface between a UE and the eNB; (2) IF2 is a D2D link, which may be PC5, but may also be a non-3GPP link, such as Bluetooth, WiFi, or other non-3GPP links; and (3) IF3 is a Uu interface, which may be assumed to be NB-IoT (i.e., the Remote UE may be in extended coverage with the eNB through NB-IoT repetitions).

The following options for how data and control information are routed to/from the remote UE over the different interfaces are possible.

First, all control and data to/from remote UE 205 may be sent over IF2. In this case, the remote UE 205, when connected to the relay UE 203, potentially may still listen to broadcast signaling over IF3, but may also receive the broadcast signaling from the relay UE 203 as well. This scheme results in the maximum power savings for the remote UE.

Alternately, control and data communications may be split. In this case, control information and procedures are performed over IF3, but data (both UL and DL) are transmitted over IF2. In this case, the remote UE 205 saves the power associated with transmission and reception of data over IF2, but not of control information.

In a third option, uplink communications and downlink communications are split. In this case, all uplink data (both control and data) is sent over IF2 and all DL data (both control and data) is sent over IF3. In this case, the UE saves power by not having to transmit in the uplink.

In a fourth option, the remote UE 205 transmits only the UL user plane (UP) data over IF2. All other traffic (DL UP as well as all control plane) is transmitted over IF3.

The techniques described in LTE Release 13 for UE to network relays for D2D have several shortcomings which make them less than ideal for IoT and wearable devices. For instance, the wearables and IoT use case is primarily for commercial use. Currently, there is no interaction between the ProSe Function and the eNB. Since, for commercial uses like wearables and IoT, it is desirable for the eNB to have substantial control over the D2D communications (e.g., determine the resources used for D2D communications), the ProSe functionality may need to be completely replaced or, at least, may have to be significantly modified to work in more close association with the eNB or the network. To enable better QoS and utilization of resources (to address a potentially large number of relays), the network should be given a greater amount of control as compared to LTE Release13 relays, including, but not limited to, being able to trigger the establishment and teardown of relay links and/or discovery. Furthermore, most wearable devices are likely to be personal gadgets. Accordingly, a typical wearable and/or IoT device should be able to connect to only one or a few relay devices in connection with which it is authorized (e.g., the gadget owner's cell phone and/or tablet). That is, in such cases, the wearable or IoT device should only able to access relay device(s) that it is configured to connect to instead of attempting to connect to all available relay UEs in proximity. Such procedures need to be clarified and outlined. Even further, the relay schemes in Release 13 are designed for a situation in which the remote device does not have connectivity to the network directly. However, the wearables use case generally will present a very different scenario, wherein the wearable device is in the coverage area of an eNB, but D2D is utilized primarily for power savings purposes. Thus, the connection and coverage assumptions for wearable and IoT relays is significantly different, leading to different assumptions related to connectivity and access.

For instance, it is not necessary to assume that the remote device does not have any direct connectivity with the network. Thus, solutions may take advantage of D2D relays for some communications but not for others. New control signaling and transport for such control signaling between the remote UE and the network (e.g., NAS) so that the remote UE can communicate with the network directly in some regards and through relays in other regards is desirable. Also, new access mechanisms and discovery mechanisms are desirable to provide greater eNB and network control over D2D communications.

Most of the embodiments discussed below are described for the case of UEs communicating using D2D under the control of an LTE network. However, such solutions are also applicable to future 5G RAT. Thus, merely as one example, while eNBs are primarily discussed below as the network control point, it should be understood that an eNB is merely an example, and that the network control point may be a cell, Transmission Point (TRP), or equivalent network control point in 5G.

In addition, the D2D links and the associated procedures are mostly described in this disclosure using PC5 (i.e., the traditional LTE D2D link). However, again, this is merely exemplary, and other technologies may be used, including non-3GPP technologies which are part of the LTE Study Item (aforementioned RP-160677, Further Enhancements to LTE Device to Device, UE to Network Relays for IoT and Wearables) as well as future device to device communication techniques for 5G, including both 3GPP-based and non-3GPP based techniques.

II.A. MME Based Relay Selection

The procedures outlined in this section are based on the premise that the subscription information of the remote device (e.g., a wearable device) is linked to the subscription of the relay device (e.g., a cellular telephone or other UE). Particularly, the wearable device and the relay UE (e.g. smartphone) will commonly be owned by the same subscriber, and, therefore, the subscription database at the network, e.g., Home Subscriber Service (HSS), may already have information that links the relay node to the wearable device when the wearable device (remote UE) attaches to the network.

Figure 3A:
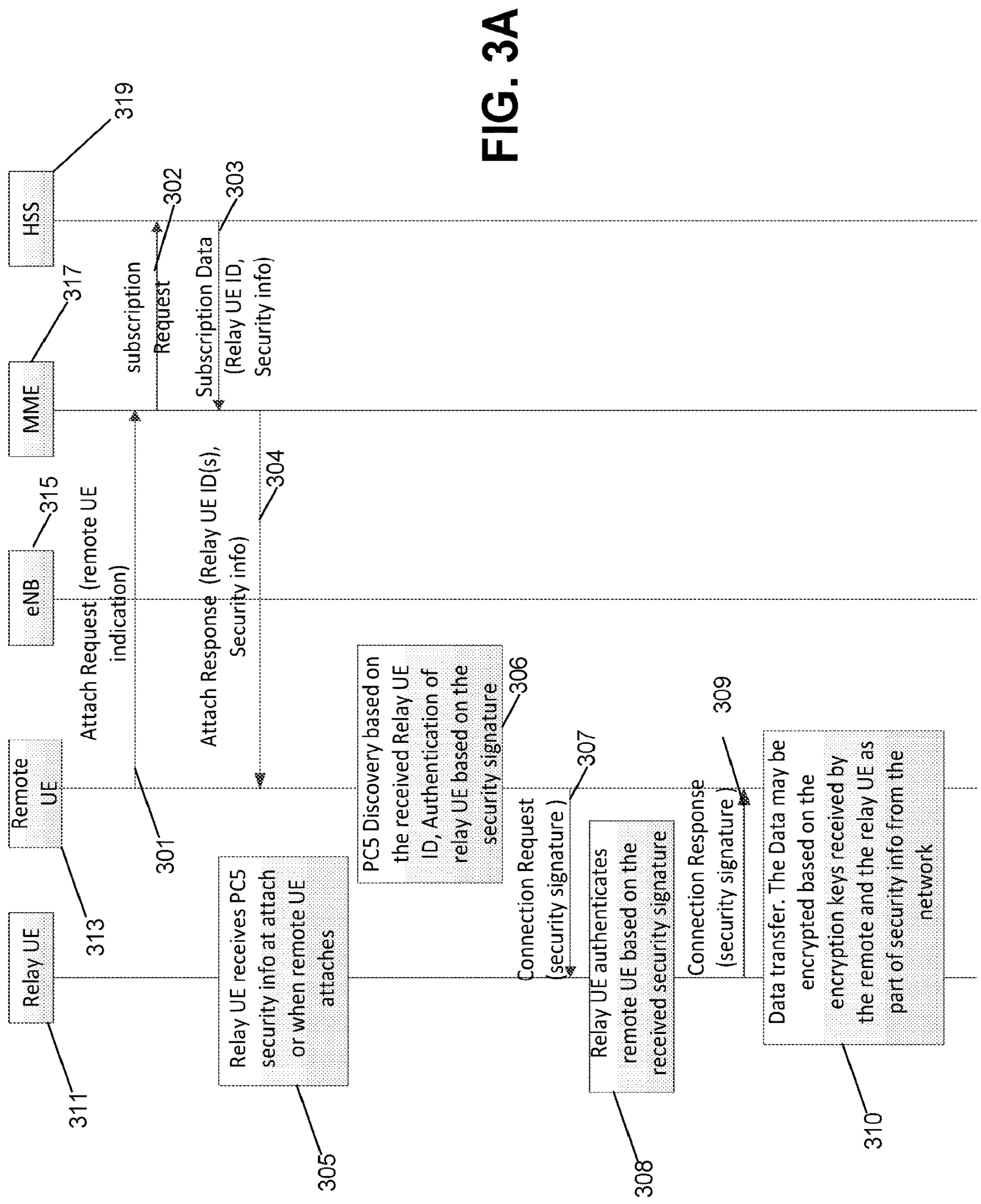
FIG. 3A is a diagram illustrating signal flow for establishing and performing D2D communications in a radio network in accordance with one MME based relay UE selection exemplary embodiment.

FIG. 3A is a signal flow diagram illustrating an exemplary procedure in accordance with an exemplary embodiment employing MME based relay selection. As shown, during the attach process 301, the wearable UE 313 may indicate to the network (MME 317) that it is capable of being a remote UE. Based on such indication, the MME 317 may query the HSS 319 (see query 302 in FIG. 3) to request information, e.g., relay UE ID(s), about any UE(s), e.g., UE 311, that are registered with the HSS as associated with the same user as the wearable UE 313 that may be used as a relay UE for this wearable UE 313. This may be done as part of the subscription request procedure. As part of the response message 303 received from the HSS 319, the MME 317 may receive security information that is specific to the remote UE-relay UE connection. It will, of course, be understood by those skilled in the related arts that the NAS signaling between the MME and the UEs may be transported via the eNB 315.

Information related to the identity of the relay UE(s) that may be obtained by the MME 317 from the HSS 319 may include, e.g., relay UE ID(s) (ID broadcasted by the relay UE for PC5 discovery) and security information, e.g., a special signature(s) which may be used by the remote UE to authenticate the relay UE (described in more detail below in connection with the PC5 discovery process 306) and vice versa (i.e., the relay UE may use the same signature to authenticate the remote UE). The MME 317 may forward this information to the remote UE 313 (e.g., wearable device) in an attach response message 304. Moreover, security keys for encrypting the data sent over the PC5 link may also be sent in the attach response message 304.

Upon completion of the attach process, the wearable UE 313 may initiate the PC5 discovery process and look for the relay UE(s) 311 based on the received relay UE ID(s). This process is represented only generally at 305 and 306 in FIG. 3 in order not to obfuscate the drawing. However, it will be understood that the PC5 discovery process involves various signaling between nodes of the network. For instance, the relay UE 311 may broadcast its security signature as part of the discovery message (PC5 discovery). The remote UE 313 authenticates the relay UE by comparing the security signature received over the PC5 discovery channel to the one received in the attach response message 304. The relay UE may be deemed to be authenticated if the signature matches.

In certain exemplary embodiments, the MME 317 may provide more than one relay UE to the remote UE in the attach response message 304. This may be the case if the wearable UE is associated with multiple relay UEs according to the subscriber information stored at the HSS 319. The remote UE 313 may then be adapted to select a specific one of the multiple potential relay UEs in the list to connect to based on certain criteria, such as any one or more or a combination of (1) measurements over PC5 as determined during the discovery process (e.g., the remote UE may simply select the relay UE with the best quality measurements or the first relay UE in the list with measurements above a certain threshold), (2) the current loads of the relay UEs (e.g., number of connected remote UEs) as advertised during discovery (choose the relay UE with the least number of connected remote UEs), (3) a predefined or configurable preference in the application layer.

The discovery process may be followed by the connection setup or association between the remote UE 313 and the relay UE 311. The connection setup message 307 sent by the remote UE 313 to the relay UE 311 may include the security signature required for the relay UE 311 to authenticate the remote UE 313. The relay UE 311 may authenticate the remote UE 313 (step 8 in FIG. 3) based on this signature assuming that it received some security information, e.g., signature context for authentication and encryption key(s), from the network when it attached to the network or when the remote UE 313 attached to the network. Alternately, the relay UE 311 may request such security information from the network when it receives the connection request 307 from the remote UE 313. The relay UE 311 authenticates the remote UE 313 based on the received security signature (308) and sends a connection response 309 to the remote UE 313. The connection response message 309 may include the relay UE's security signature.

Data transfer 310 may commence upon completion of the connection setup. Such data transfer may be ciphered by the keys received previously from the network both by the remote UE and the relay UE.

Note that the attach request message 304 is merely exemplary in the above described procedure. Other NAS messages (mobility management, session management or a new NAS message) alternately or additionally may be used for this purpose in this procedure.

II.B. Remote UE Based Relay Selection

Figure 3B:
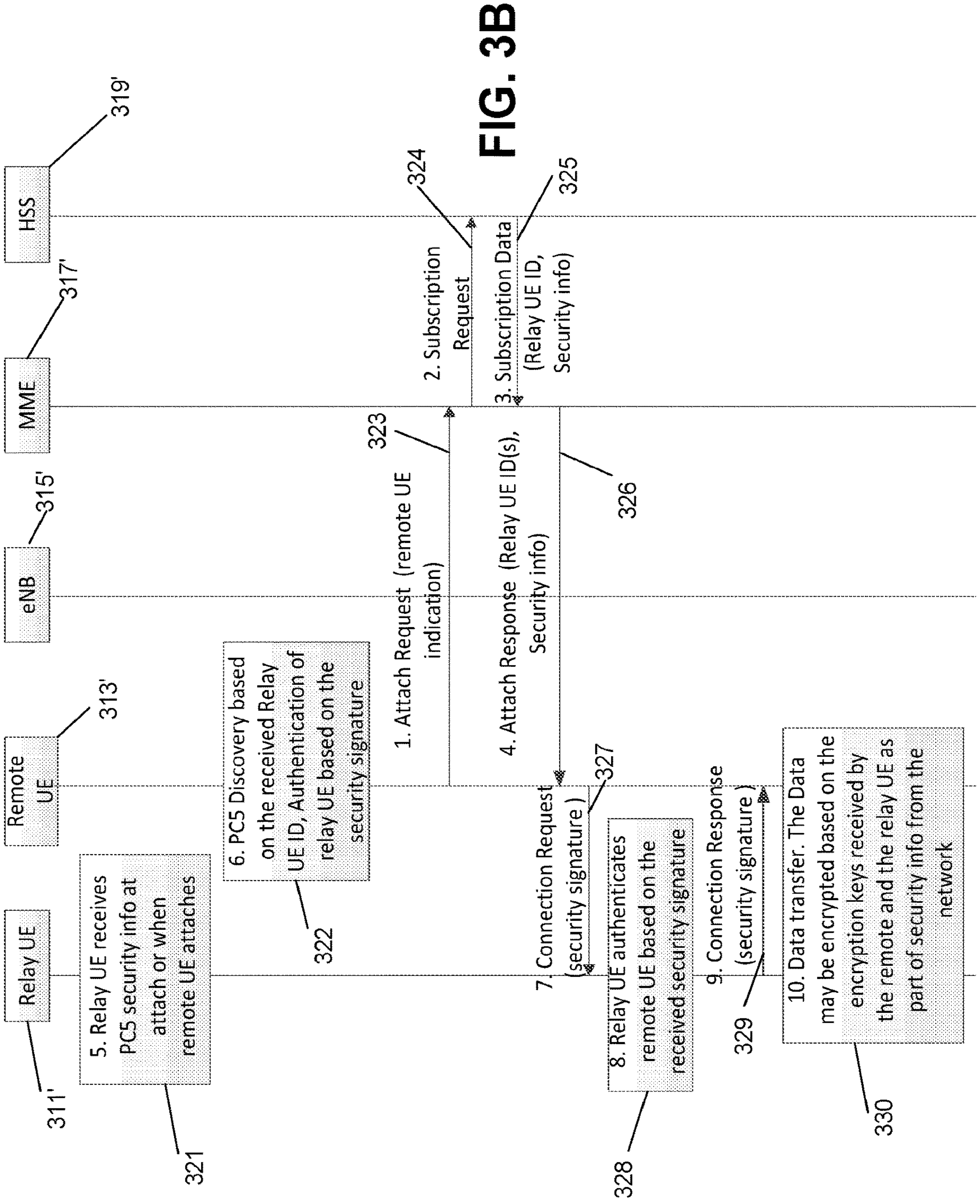

In a remote UE based exemplary embodiment such as illustrated in FIG. 3B, the remote UE 313' may perform PC5 discovery 321, 322 (compare to 305, 306 in FIG. 3) before the attach procedure with the network 323, 324, 325, 326 (compare to 301, 302, 303, 304 in FIG. 3). By performing PC5 discovery 321, 322, the remote UE 313' becomes cognizant of the available relay UE(s) 311' in its vicinity. The remote UE 313', through this discovery process, may generate a list of the identities of all the available relay UEs (or a subset of the surrounding relay UEs).

The subset may, for instance, be determined based on one or more predefined criteria such as the Public Land Mobile Network (PLMN) to which the potential relay UE belongs. For instance, only the relay UEs belonging to specific PLMNs may be stored by the remote UE. The PLMN information may be broadcasted by the relay UE as part of the PC5 discovery message or may be part of the broadcasted relay UE ID. Alternately or additionally, only the potential relay UEs that meet a signal level threshold may be selected. Note that, due to the low transmission power nature of the remote UEs, the remote may be able to listen to discovery signals from some of the relay UEs, but not be able to transmit to them.

Alternately or additionally, the broadcast discovery messages may include an indication of whether the potential relay UE supports relaying for wearable devices or IoT devices. Such information may be broadcast by the relay UE as part of the PC5 discovery message.

Alternately or additionally, the remote UE may consider information about the type of service (e.g., health monitoring service) supported by the relay UE. The relay UE may broadcast the supported services in the PC5 discovery message.

Alternately or additionally, the remote UE may consider the current load of the relay UE (e.g., in terms of number of remote UEs already connected to the relay UE).

After the discovery procedure 321, 322, the remainder of the process may proceed substantially as in FIG. 3A.

For instance, the remote UE 313 may then perform the attach procedure with the network (compare to 301, 302, 303, 304 in FIG. 3). The attach message 323 in this embodiment may differ from that described in connection with the network based embodiment (FIG. 3A) in that it may contain the list (Relay UE IDs) of possible relay candidates based on the aforementioned discovery procedure and criteria for selecting a smaller subset of the possible relay UE(s) as described above. The MME 317' upon receiving this information may check (message 324) the HSS 319' for the subscription profile of the remote UE 313' and possibly the subscription information of each of the relay UEs which are part of the list that is included in the attach message 301 received from the remote UE. The HSS 319' should respond (message 325) and the MME 317' may then use the information received from the HSS 319' in message 325 and the parameters in the attach message 323 to select a relay UE 311' that the remote UE 313' should try to connect to. Such relay UE information may be communicated back to the remote UE in an attach accept message 326.

It may be possible that the MME 317' selects more than one possible relay UE. If such were the case, the MME 317' may send the associated priority of each relay UE in the attach accept message 326. The remote UE 313' may start by trying to associate with the relay UE that has the highest priority (message 327). The relay UE 311' authenticates the remote UE 313' based on the received security signature (328) and sends a connection response 329 to the remote UE 313'. The connection response message 329 may include the relay UE's security signature. Data transfer 330 may commence upon completion of the connection setup. Such data transfer may be ciphered by the keys received previously from the network both by the remote UE and the relay UE.

If the remote UE is unable to connect to that relay UE, it may try to associate with the next highest ranked relay UE in the priority list and so on. As previously described, the security parameters (authentication signature, encryption keys, etc.) may also be sent by the MME for authentication purpose and ciphering of the user data.

The MME 317' may consider one or more additional factors apart from subscription information to decide the list of relay UEs along with their associated priority for the remote UE. For instance, it may consider the PLMN IDs of the relay UEs. For example, The MME may only allow a remote UE to connect to relay UEs from specific PLMNs taking into account network sharing agreement with various PLMNs. Alternately or additionally, the MME may consider the type (e.g. wearable UE or IoT UE) of the remote UE and/or the number of remote UEs already connected to the relay UE. The MME may be aware of the type of remote UEs and the number of remote UEs connected to a particular relay UE based on the messaging exchange between the relay UE or remote UE and the MME when the remote UE connects to the relay UE.

Alternately or additionally, the MME may consider the type of service (e.g. smartwatch, priority service such as health monitoring which is being requested by the remote UE). The service information may be part of the attach message or a different NAS message exchange between the UE and the Core Network.

II.C. Core Network Procedures for Remote UE

This section pertains to NAS signaling between the remote UE and the core network through the relay UE. In other words, it pertains to the control messages (e.g., NAS messages) that are sent by the remote UE to the relay UE, which the relay UE then forwards to the core network on behalf of the remote UE (as opposed to the control messages, such as messages 1 and 4 in FIG. 3, that are transported directly between the remote UE and the network).

The procedures discussed below may be executed when the remote UE discovers the relay UE for the first time or once the remote UE receives an indication or a trigger from the eNB or the network to move traffic, or more specifically control signaling, to the relay node.

II.C.1. NAS Message Transport

Figure 4:
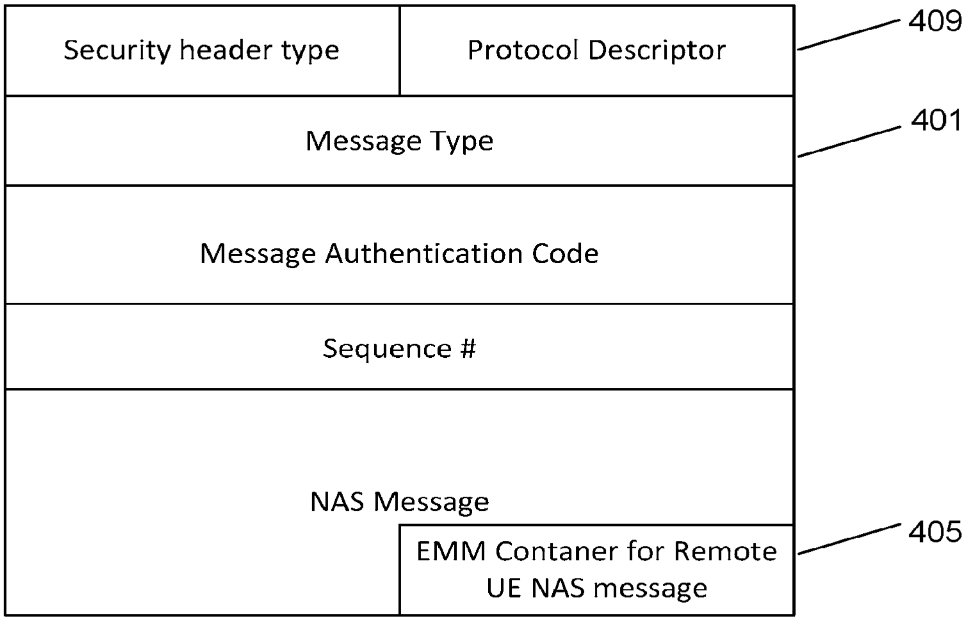
FIG. 3B is a diagram illustrating signal flow for establishing and performing D2D communications in a radio network in accordance with one remote UE based relay UE selection exemplary embodiment and FIG. 4 shows NAS message structure in accordance with one exemplary embodiment.

The remote UE may send the NAS messages to the relay UE over PC5-S or a sidelink channel. It is assumed that there is a sidelink channel for control signaling. Referring to FIG. 4, a new message type (e.g., PDCP SDU Type) 401 or L2 protocol ID (e.g. ProSe Destination L2 ID) may be defined for NAS messages from the remote UE to the relay UE over sidelink such that the relay UE receiving the control message understands that the control message is a NAS message and is, therefore, to be forwarded to the NAS layer of the relay UE. Alternatively, NAS messages between the remote UE and the relay UE may be transmitted over a separate pool of resources over PC5, or may be identified with a dedicated ProSe Per Packet Priority (PPPP) or sidelink logical channel.

FIG. 4 shows an NAS message structure for the relay UE to use for forwarding an NAS message that is received from the remote UE (e.g., via the aforementioned PC5-S channel or sidelink channel) to the MME (or other network node) according to an exemplary embodiment. A new EPS Mobility Management (EMM) message container 405 may be added at the NAS layer. The purpose of such container is to transport remote UE NAS messages to the MME in this container via the NAS signaling connection between the relay UE and the MME. The new EMM 405 container is sent to the MME in an EMM NAS message (new or existing). A new value for the protocol discriminator Information Element (IE) 409 is defined so that the MME understands that the received message is a NAS message from a remote UE. The MME takes further actions based on the payload of the message container 405. Note that a similar method may be employed for session management (SM) messages.

In the downlink, the MME may encapsulate NAS messages intended for the remote UE in an EMM message container 405 in a similar NAS message to the relay UE. The relay UE, based on the protocol discriminator 409 of the incoming NAS message, infers that the message is destined for the remote UE. The NAS layer of the relay UE would further check the EMM message container 405 payload to determine the ID, e.g., Globally Unique Temporary UE ID (GUTI), of the remote UE that the NAS message is intended for. There may be a mapping at the NAS layer between the remote UE GUTI (identity known at the CN) and sidelink ID (e.g., ProSe ID). The relay UE then passes the NAS message to the Access Stratum (AS) with the ProSe ID, whereby such identity would be used by the AS to transmit the message to the remote UE over the sidelink. Upon reception of the sidelink message, based on the message type or L2 protocol ID described earlier, the message is forwarded to the NAS layer in the remote UE.

The NAS messages exchanged between the relay UE and the MME also may contain a message type in addition to the protocol discriminator, albeit such information also may be in the remote UE EMM container with remote UE NAS payload. Having such information as part of the message may help the MME prioritize various requests during periods of high congestion.

II.C.2. Tracking Area Update

The relay UE may perform a Tracking Area Update (TAU) procedure on behalf of the one or more remote UEs connected to it. It is assumed that the relay has up to date knowledge about the remote UE communicating with the relay UE. Given this, the remote UE may not have to perform tracking area update directly with the MME. Instead the relay UE may include the identities of the remote UEs when performing periodic TAU or normal TAU procedures. Since the TAU procedure is executed between the relay UE and the MME, the reception of a TAU accept message may not be communicated to the remote UE(s). However, in certain scenarios, the remote UE may have a need for the information in the TAU response from the MME. For example, if the TAU procedure is rejected by the MME, the remote UE may wish to be notified of that fact since the reception of a TAU reject may mean that the remote UE may have to take certain actions, e.g., reattach to the network. PC5-S signaling with a new message type may be used to communicate such rejection scenarios to the remote UEs. The PC5-S message may also contain the cause code/value indicating the reason for the rejection.

Furthermore, the relay UE may use the NAS transport method described earlier to send the normal TAU message for an individual remote UE. This may happen, for instance, when a particular UE needs to send a normal TAU to reconfigure network parameters, e.g., Power Savings Mode (PSM) timer or change of UE capabilities etc.

If a scenario occurs wherein a remote UE moves out of the coverage of the relay UE it has been using and the remote UE is in idle mode, a TAU may be triggered by the remote UE. This TAU would be sent directly from the remote UE to the MME (e.g., using the Uu of the cell) since the "remote" UE would, by definition, no longer be attached to the relay UE. The purpose of such TAU message would be to inform the network that the remote UE is now out of the coverage of the previously connected relay UE. The network may then send all the control signaling to the remote UE directly (via the Uu interface). This behavior may continue until the remote UE connects to the same or a different relay node. When the remote UE reconnects to the same or a different relay node, the network may then revert back to sending control messages via the relay node. Reception of a TAU message by the network via a relay node may be considered to be an indication for the network to transmit Mobile Terminated (MT) traffic (both data and signaling) via the relay UE.

III. CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed", "computer executed", or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, were provided above with respect to FIGS. 1A-1E.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to", "at least," "greater than", "less than", and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented by a first wireless transmit/receive unit (WTRU), the method comprising:

establishing a device to device (D2D) communication link between the first WTRU and a second WTRU, wherein the first WTRU acts as a relay to a network for the second WTRU;

receiving a first D2D message from the second WTRU, the first D2D message comprising a non-access stratum (NAS) message, and wherein the NAS message comprises a tracking area update (TAU) message;

sending a message to the network based on receiving the first D2D message comprising the NAS message from the second WTRU;

receiving a rejection message from the network in response to the message, wherein the rejection message is an out of coverage rejection based on the TAU message; and transmitting a second D2D message to the second WTRU based on receiving the rejection message from the network, the second D2D message indicating rejection cause information.

2. The method of claim 1, wherein the second D2D message indicates that the second WTRU is to re-connect to the network.

3. The method of claim 1, wherein the first D2D message and the second D2D message correspond to respective PC5 messages.

4. The method of claim 1, wherein the first D2D message and the second D2D message correspond to respective sidelink messages.

5. The method of claim 1, further comprising: performing a D2D WTRU discovery procedure to discover the second WTRU.

6. The method of claim 1, wherein the message sent to the network comprises an identity of the second WTRU.

7. A first wireless transmit/receive unit (WTRU) comprising a processor and memory, the processor and memory configured to:

establish a device to device (D2D) communication link between the first WTRU and a second WTRU, wherein the first WTRU is configured to act as a relay to a network for the second WTRU;

receive a first D2D message from the second WTRU, the first D2D message comprising a non-access stratum (NAS) message, and wherein the NAS message comprises a tracking area update (TAU) message;

send a message to the network based on receiving the first D2D message comprising the NAS message from the second WTRU;

receive a rejection message from the network in response to the message, wherein the rejection message is an out of coverage rejection based on the TAU message; and transmit a second D2D message to the second WTRU based on receiving the rejection message from the network, the second D2D message indicating rejection cause information.

8. The first WTRU of claim 7, wherein the second D2D message indicates that the second WTRU is to re-connect to the network.

9. The first WTRU of claim 7, wherein the first D2D message and the second D2D message correspond to respective PC5 messages.

10. The first WTRU of claim 7, wherein the first D2D message and the second D2D message correspond to respective sidelink messages.

11. The first WTRU of claim 7, further comprising: performing a D2D WTRU discovery procedure to discover the second WTRU.

12. The first WTRU of claim 7, wherein the message sent to the network comprises an identity of the second WTRU.

* * * * *